US005529366A

United States Patent [19]
Gold

[11] Patent Number: 5,529,366
[45] Date of Patent: Jun. 25, 1996

[54] AUTOMOTIVE WINDOW PERIPHERAL FRAMING ASSEMBLY AND METHOD OF INSTALLING SAME

[76] Inventor: Peter Gold, 465 N. Wood Rd., Rockville Centre, N.Y. 11570

[21] Appl. No.: 300,478

[22] Filed: Sep. 2, 1994

[51] Int. Cl.$^6$ ....................................................... B60J 1/00
[52] U.S. Cl. .................................... 296/96.21; 296/146.15
[58] Field of Search ........................... 296/96.21, 146.15, 296/146.14, 201; 411/178

[56] References Cited

U.S. PATENT DOCUMENTS

| 3,823,526 | 7/1974 | Rose | 411/178 X |
| 4,723,809 | 2/1988 | Kida et al. | 296/96.21 |
| 5,242,207 | 9/1993 | Carson et al. | 296/146.15 |

FOREIGN PATENT DOCUMENTS

| 135813 | 1/1950 | Australia | 296/96.21 |
| 620559 | 3/1949 | United Kingdom | 296/96.21 |
| 630062 | 10/1949 | United Kingdom | 296/96.21 |
| 678891 | 9/1952 | United Kingdom | 296/96.21 |

Primary Examiner—Joseph D. Pape
Attorney, Agent, or Firm—Galgano & Burke

[57] ABSTRACT

An automotive window peripheral framing assembly for retaining a window pane on an exterior side of flange of an automotive vehicle body defining a window opening and for retaining an automotive accessory on the interior side of the flange includes a window pane, and a resilient molding peripherally extending about and secured to the window pane, which molding has a wall abutting the exterior side of the flange. A plurality of rosette double screws is also provided, each having a first screw having a screw head and an externally-threaded shank secured to the screw head, which shank extends through the flange and is threadably received in the molding to secure the same to the flange. The first screws each have an internally-threaded bore extending from the first screw head into the first shank thereof. The rosette screws are spaced apart along the flange and also include a second screw having a screw head and an externally threaded shank secured to the screw head of the second screw of the shank of which is threadably receivable in the internally threadable bore of the first screw for retaining an automotive accessory on the interior side of the flange. A method of installing the framing assembly is also disclosed.

5 Claims, 1 Drawing Sheet

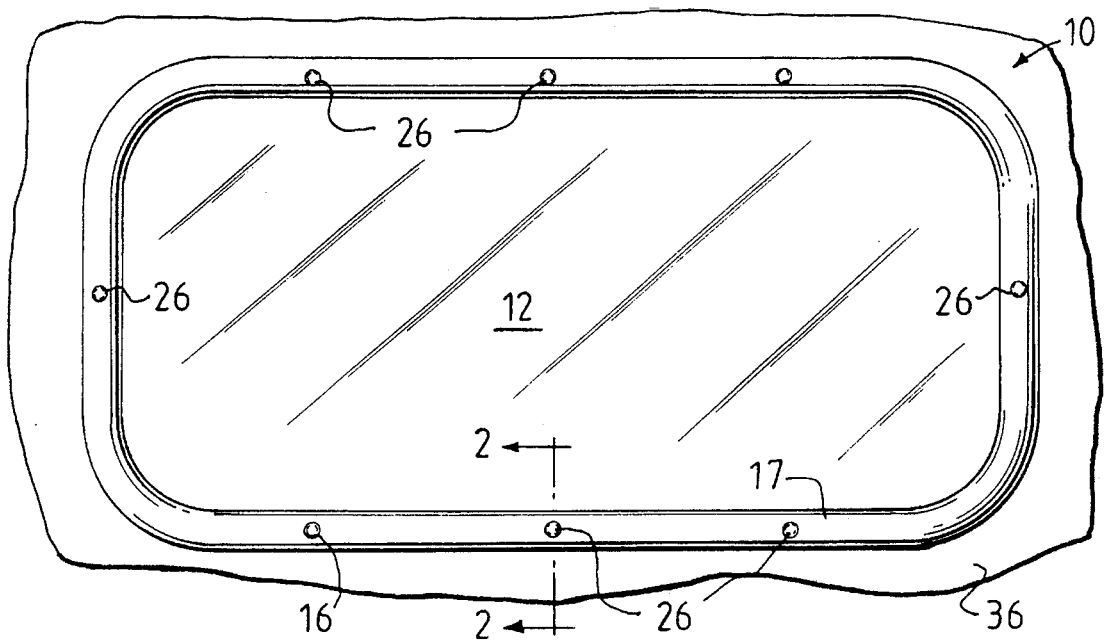
Fig. 1
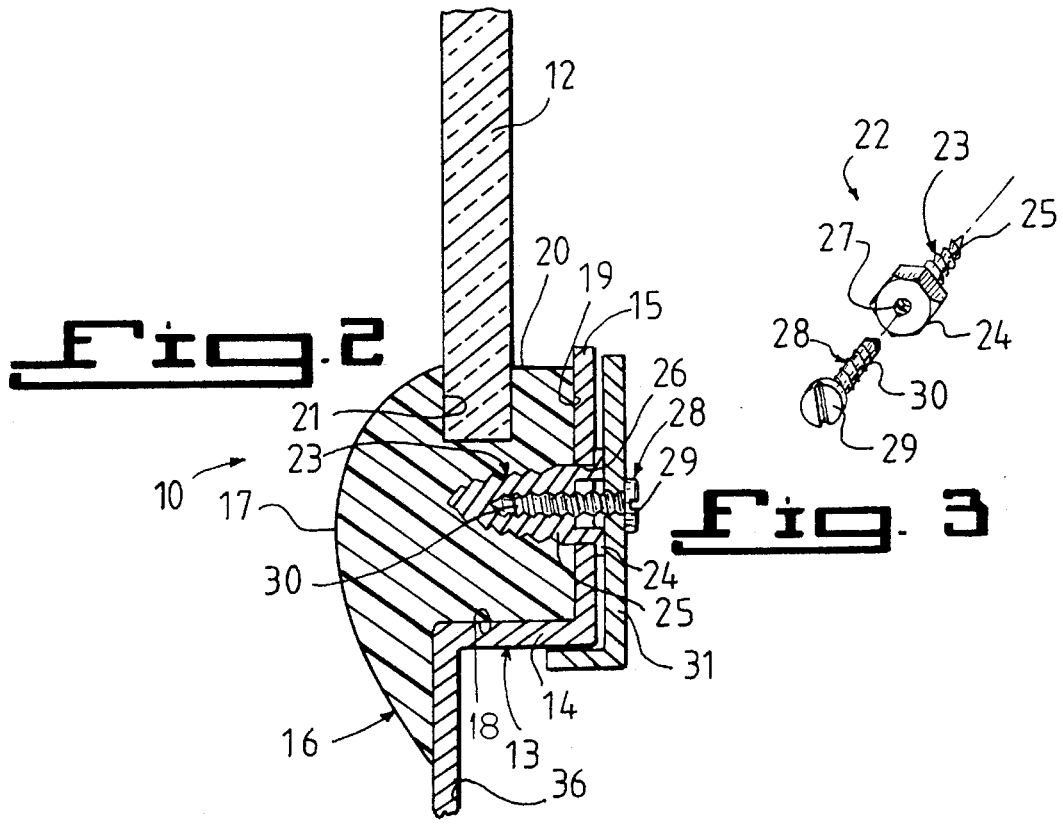
Fig. 2
Fig. 3

AUTOMOTIVE WINDOW PERIPHERAL FRAMING ASSEMBLY AND METHOD OF INSTALLING SAME

BACKGROUND OF THE INVENTION

1. Field of the Invention

The present invention relates to an automotive window peripheral framing assembly for retaining a window pane in an auto window opening defined by an auto body panel flange and for retaining an interiorly-disposed accessory thereon and a method for installing the same. More particularly, the invention concerns such an assembly and method which employs a rosette double screw, which serves the dual purpose of retaining both the auto window molding and window panel and the interiorly-disposed accessory.

2. The Prior Art

A variety of car windshields are installed with peripheral framing around the peripheral edge of the windshield. (See, for example, U.S. Pat. No. 4,850,640 and U.S. Pat. No. 4,986,595.) Typically, the auto window is mounted in a window opening defined by a generally L-shaped auto body flange via peripheral molding attached thereto via adhesive or screws or the like. The interior side of the flange is normally covered with a shroud cover, or other interior finishings, secured by additional screws to the automotive body or flange. The use of these additional retaining means will create additional holes in the body panel and/or flange creating a greater possibility of water penetration into the vehicle. In addition, the use of these additional retaining means incurs significant additional amounts of time and labor in order to mount the shroud cover and other automobile interior packages.

SUMMARY OF THE INVENTION

Accordingly, it is an object of the present invention to provide a novel peripheral framing system and method of installing same, which serves the dual purpose of both retaining a glass window pane on the flange of an auto motor vehicle body and at the same time can be used to retain an interiorly disposed accessory.

It is a further object of the present invention to provide such a novel peripheral framing system which minimizes the number of fasteners used and the number of openings required in the body flange to mount the window and framing system and the interior auto accessories.

It is another object of the present invention to provide such a novel framing assembly which is easy to install and which affords significant savings in time and labor.

Certain of the foregoing and related objects are readily attained in an automotive window peripheral framing assembly for retaining a window pane on an exterior a flange of an automotive vehicle body defining a window opening and for retaining an automotive accessory on the interior side of the flange which includes a window pane, a resilient molding peripherally extending about and secured to the window pane, the molding having a bottom wall abutting the exterior side of the flange, and a plurality of rosette double screws. Each double screw has a first screw having a screw head and an externally-threaded shank secured to the screw head, which shank extends through the flange and is threadably received in the molding to secure the same to the flange. The first screws each have an internally-threaded bore extending from the first screw head into the first shank thereof. The rosette screws are spaced apart along the flange and also include a second screw having a screw head and an externally threaded shank secured to the screw head of the second screw of the shank, which is threadably receivable in the internally threadable bore of the first screw for retaining an automotive accessory on the interior side of the flange.

Preferably, the molding comprises an elastomeric gasket having a peripherally-extending channel in which the peripheral edge of the window pane is received. Most desirably, the accessory is an interior automotive shroud cover.

Certain of the foregoing and related objects are also attained in a method of installing an automotive window peripheral framing assembly for retaining a window pane supported on the flange of an automotive vehicle body and for retaining the interiorly-diposed accessory, comprising the steps of placing a resilient molding about the peripheral edge of a window pane, placing the molding on the exterior flange side of an automotive window vehicle body defining a window opening, providing a series of spaced-apart openings in said flange of said auto body panel, installing a rosette double screw into each of said openings in said flange, said rosette double screws each having a first screw having a screw head and an externally-threaded shank secured to the screw head, which shank is inserted through one of said flange opening and is threadably received in said molding to secure the same to said flange, said first screws each having an internally-threaded bore extending from said first screw head into said first shank thereof, and securing an interiorly-disposed accessory to said flange via a second screw of said rosette double screw having a screw head and an externally-threaded shank secured to the screw head of said second screw by inserting said shank of said second screw through said accessory, preferably an interior automotive shroud cover, and threadably engaging the same in said internally-threaded bore of said first screw, thereby retaining said accessory on the interior side of said flange.

BRIEF DESCRIPTION OF THE DRAWINGS

These and other objects and advantages of the present invention will become apparent from the following description of the accompanying drawing which discloses one embodiment of the present invention. It is to be understood that the drawing is to be used for the purpose of illustration only and not as a definition of the invention.

In the drawing, wherein similar reference numerals denote similar elements throughout the several views:

FIG. 1 is a front elevational view of the automotive window peripheral framing assembly of the present invention retaining a window pane on an automotive vehicle body;

FIG. 2 is a fragmentarily-illustrated, sectional view thereof, taken along line 2—2 of FIG. 1; and FIG. 3 is an exploded, perspective view of the rosette double screw used in the assembly.

DETAILED DESCRIPTION OF THE PREFERRED EMBODIMENT

Turning now in detail to the drawing and, in particular FIG. 1 thereof, therein illustrated is a novel automotive window peripheral framing assembly embodying the present invention, generally designated 10, which is specifically intended for mounting a fixed automotive window 12 on a recessed L-shaped flange 13 of a vehicle body 36 defining a window opening of a vehicle.

As shown best in FIG. 2, framing assembly 10 includes a peripherally-extending molding 16 which is preferably made from extruded elastomeric EPDM rubber. Molding 16 comprises a decorative trim or crown portion 17 adapted to bridge the space between the window glass or pane 12 and the body opening defined by the L-shaped flange 13 in overlying engagement therewith. Molding has an outer side wall 18, which abuts the first flange leg 14 of the L-shaped flange 13, and a inner side wall 19, which abuts the second flange leg 15 of the L-shaped flange 13. The inner sidewall 20 of the resilient reveal molding has a generally U-shaped cavity 21 formed therein, which is intended to receive the peripheral edge of the window pane 12.

A rosette double screw, generally designated 22, of the type shown in FIG. 3, is used to secure the molding 16 to the flange 13. The rosette double screw 22 is composed of a first screw 23 having a head 24 and an externally-threaded shank 25 secured to the screw head 24, which shank 25 extends through a hole 26 in first flange leg 15 and is threadably received in the molding 16 to secure the same to the flange 13.

As shown in FIG. 1, the holes 26 and the rosette screws 22 are spaced along the flange 13 at predetermined intervals to provide a uniform retention system for the glass window pane 12.

The first screws 23 each have an internally-threaded bore 27 extending from the first screw head 24 into the first shank 25 thereof for receiving a second screw 28 having a second screw head 29 and an externally-threaded shank 30 secured thereto.

The shank 30 of the second screw 28 is threadably receivable in the internally threaded bore 27 of the first screw 22 for retaining an accessory 31 on the interior side of the automotive body flange 13. In particular, as shown in FIG. 2, the same is being used to support an interior panel or shroud cover 31, or any other retainer or accessory which is needed to be mounted on the interior of the auto body panel 36. As can be appreciated, by using the rosette double screw 22 for the dual purpose of retaining both the peripheral molding 16 and the interior accessory 31 to the body flange 13, it is not necessary to provide additional holes 26 in the body flange 13 or body panel 36 for mounting the car's interior packaging, molding, trim, etc., as a result of which the possibility of water penetrating into the vehicle is minimized. In addition, this saves the installer time in mounting the interior packaging, since he no longer needs to provide an additional screw hole or fastener mounted on the body panel. Instead, he can simply use the screw hole 27 provided by the first screw 23 of the rosette double screw 22 to mount any interior material to the body panel 36.

Various modifications may be made, as will be apparent to those skilled in the art. For example, while the peripheral molding is preferably made from elastomeric E.P.D.M. rubber, other materials could, of course, be employed. In addition, other configurations and types of peripheral molding can be used in combination with the present invention. The peripheral framing could also be used in combination with various adhesives, sealants or the like in order to prevent water intrusion.

Accordingly, while only a single embodiment of the present invention has been shown and described, it is to be understood that many changes and modifications may be made thereunto without departing from the spirit and scope of the invention as disclosed herein.

What is claimed is:

1. An automotive window peripheral framing assembly for retaining a window pane on an exterior a flange of an automotive vehicle body defining a window opening and for retaining an automotive accessory on the interior side of said flange comprising:
    a window pane;
    a resilient molding peripherally extending about and secured to said window pane, said molding having a wall abutting the exterior side of said flange; and
    a plurality of rosette double screws, each having a first screw having a screw head and an externally-threaded shank secured to said screw head, which shank extends through said flange and is threadably received in said molding to secure the same to said flange, and said first screws each having an internally-threaded bore extending from said first screw head into said first shank thereof, said rosette screws being spaced apart along said flange and including a second screw having a screw head and an externally threaded shank secured to said screw head of said second screw, the shank of which is threadably receivable in said internally threadable bore of said first screw for retaining an automotive accessory on the interior side of said flange.

2. The assembly of claim 1, wherein said molding comprises an elastomeric gasket having a peripherally-extending channel in which the peripheral edge of the window pane is received.

3. The assembly of claim 1, wherein said accessory is an interior automotive shroud cover.

4. A method of installing an automotive window peripheral framing assembly for retaining a window pane supported on a flange of an automotive vehicle body and for retaining an interiorly-disposed accessory, comprising the steps of:
    (a) placing a resilient molding about the peripheral edge of a window pane;
    (b) placing the molding on an exterior flange side of an automotive [window]vehicle body defining a window opening;
    (c) providing a series of spaced-apart openings in said flange of said automotive vehicle body;
    (d) installing a rosette double screw into each of said openings in said flange, said rosette double screws each having a first screw having a screw head and an externally-threaded shank secured to the screw head, which shank is inserted through one of said flange opening and is threadably received in said molding to secure the same to said flange, said first screws each having an internally-threaded bore extending from said first screw head into said first shank thereof; and
    (e) securing an interiorly-disposed accessory to said flange via a second screw of said rosette double screw having a screw head and an externally-threaded shank secured to the screw head of said second screw by inserting said shank of said second screw through said accessory and threadably engaging the same in said internally-threaded bore of said first screw, thereby retaining said accessory on the interior side of said flange.

5. The method of claim 4, wherein said accessory is an interior automotive shroud cover.

* * * * *